US012202284B1

(12) United States Patent
Jeretzky et al.

(10) Patent No.: US 12,202,284 B1
(45) Date of Patent: Jan. 21, 2025

(54) PRINTING MACHINE COMPRISING AT LEAST ONE PRINT HEAD

(71) Applicant: KOENIG & BAUER AG, Würzburg (DE)

(72) Inventors: Gerald Jeretzky, Hüllhorst (DE); Volker Steffen, Herford (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/709,100

(22) PCT Filed: Feb. 6, 2023

(86) PCT No.: PCT/EP2023/052834
§ 371 (c)(1),
(2) Date: May 10, 2024

(87) PCT Pub. No.: WO2023/213452
PCT Pub. Date: Nov. 9, 2023

(30) Foreign Application Priority Data

May 5, 2022 (DE) ..................... 10 2022 111 172.5

(51) Int. Cl.
*B41J 3/407* (2006.01)
*B41J 2/145* (2006.01)
*B41J 25/00* (2006.01)

(52) U.S. Cl.
CPC ........... *B41J 3/40733* (2020.08); *B41J 2/145* (2013.01); *B41J 3/40731* (2020.08); *B41J 25/001* (2013.01)

(58) Field of Classification Search
CPC .... B41J 3/40733; B41J 3/40731; B41J 2/145; B41J 25/001
See application file for complete search history.

(56) References Cited

U.S. PATENT DOCUMENTS

2005/0243112 A1 11/2005 Kobayashi et al.
2013/0215196 A1 8/2013 Lewartowski et al.
(Continued)

FOREIGN PATENT DOCUMENTS

EP 2842756 A1 3/2015
EP 3909780 A1 11/2021
(Continued)

OTHER PUBLICATIONS

International Search Report of PCT/EP2023/052834 dated Apr. 25, 2023.

*Primary Examiner* — Jason S Uhlenhake
(74) *Attorney, Agent, or Firm* — MATTINGLY & MALUR, PC

(57) ABSTRACT

A printing machine includes a print head that prints on an article that rotates during printing. A printing width of the print head extends over a section of a length of the article and longitudinally in relation to a longitudinal axis of the article. An orthogonal coordinate system has an origin at a center of mass of the print head, with longitudinal, transverse, and vertical axes. A plurality of the print heads print on the article and are arranged in a row longitudinally in relation to the axis of rotation of the article. The ink ejected by the printing nozzles of the print heads is situated in the same printing plane. The direction of the ink ejected is oriented perpendicularly to the surface of the article. Multiple different printing planes are provided with respect to the surface of the article. Directly adjacent printing planes create a V-shaped formation.

9 Claims, 3 Drawing Sheets

(56) References Cited

U.S. PATENT DOCUMENTS

| | | | |
|---|---|---|---|
| 2015/0035897 | A1 | 2/2015 | Monteiro et al. |
| 2016/0221361 | A1 | 8/2016 | Till et al. |
| 2017/0066232 | A1 | 3/2017 | Litvinov et al. |
| 2017/0203563 | A1 | 7/2017 | Matsuhashi et al. |
| 2017/0210153 | A1* | 7/2017 | Tenaud .................. B41J 25/312 |
| 2017/0253024 | A1* | 9/2017 | LaCaze .................. B41J 3/4073 |
| 2021/0276342 | A1 | 9/2021 | Murray |
| 2022/0072876 | A1* | 3/2022 | Barrett ............... B41J 11/00214 |

FOREIGN PATENT DOCUMENTS

| | | | |
|---|---|---|---|
| JP | 2009-184121 | A | 8/2009 |
| WO | 2015/186592 | A1 | 12/2015 |
| WO | 2022/207529 | A1 | 10/2022 |

* cited by examiner

PRINTING MACHINE COMPRISING AT LEAST ONE PRINT HEAD

CROSS-REFERENCES TO RELATED APPLICATIONS

This application is the US national phase, under 35 USC § 371, of PCT/EP2023/052834, filed on Feb. 6, 2023, published as WO 2023/213452 A1 on Nov. 9, 2023, and claiming priority to DE 10 2022 111 172.5, filed May 5, 2022, and all of which are incorporated by reference herein in their entireties.

TECHNICAL FIELD

The examples herein relate to a printing machine comprising at least one print head. The relevant print head being designed to print in an ink jet printing process a surface of an article that rotates during the printing process; a printing width of the relevant print head in each case extending over a section of a length of the article to be printed; the relevant section in each case extending longitudinally in relation to a longitudinal axis of the article to be printed; a three-dimensional, orthogonal coordinate system, the origin of which is arranged in a center of mass of the relevant print head and which is fixed in terms of the print head, having a longitudinal axis and a transverse axis and a vertical axis; the longitudinal axis of the relevant print head extending parallel to the printing width of this print head; a plurality of print heads that each print the surface of the relevant article in an ink jet printing process being provided; these print heads being arranged in a row longitudinally in relation to the longitudinal axis of the article to be printed; a respective direction of the ink ejected by the respective printing nozzles of these print heads and the longitudinal axis of the article to be printed being situated in the same printing plane; the respective direction of the ink ejected by the respective printing nozzles of these print heads being in each case oriented perpendicularly to the surface of the relevant article to be printed; a plurality of different printing planes being provided with respect to the surface of the relevant article to be printed; and directly adjacent printing planes creating a V-shaped formation; a control unit being provided, this control unit being designed so as to track, or at least be able to track, a respective printing position of the relevant print head during an ongoing printing process based on a surface geometry of the article to be printed; and a mount holding the relevant print head being provided.

BACKGROUND

A printing system for printing on curved surfaces of a multitude of objects is known from US 2017/0066232 A1, the printing system comprising: a support platform for supporting and moving the plurality of objects along a closed track, which are independently controlled with respect to the speed and position thereof; a plurality of grippers, which are spaced apart along a length of the support platform, each of the plurality of grippers being configured to hold and rotate a respective object at a predetermined working distance between the curved surface of the object and respective print head units arranged along a zone of the closed track, each of the plurality of grippers comprising a circular arrangement of spaced-apart elongated elements, which are substantially parallel to a center line of the gripper, and a lever mechanism, which is configured to simultaneously move the elongated elements toward and away from the center line of the gripper, whereby the cross-sectional dimensions of the grippers are changed so as to fit into objects having different dimensions; and a control unit, which is configured and can be operated to adapt the cross-sectional dimensions of the plurality of grippers so as to fit into the plurality of objects, rotate the objects and move the support platform along the closed track to simultaneously print the plurality of objects by way of the print head units.

A print bar structure for a printing apparatus for use in printing on an outer surface of an object is known from US 2021/0276342 A1, the object comprising at least one cylindrical portion, the print bar structure comprising the following: a body defining a print zone for receipt of the object to be printed, wherein the print zone has a central axis; and a plurality of radially spaced attachment formations provided adjacent the print zone for attachment of a plurality of print heads, wherein the print heads are operatively disposed within the print zone to form an arch within the print zone to deposit fluid from a fluid source onto the object along a printing axis which is at least transverse to the central axis of the print zone, wherein the print bar structure comprises a plurality of print banks, wherein each print bank comprises attachment formations for one or more print heads, and wherein each print bank extends along an axis which is obliquely oriented with respect to the central axis or wherein the arch defined by the print heads extends along an axis which is obliquely oriented with respect to the central axis.

A liquid discharge device is known from US 2017/0203563 A1, comprising: a discharge unit that discharges liquid from nozzles to a medium; a rotating mechanism that relatively rotationally moves the medium and the discharge unit around a rotation axis direction crossing a discharge direction of the liquid; and a control unit that controls a discharge frequency of the liquid according to a relative moving distance between the medium and the discharge unit per unit time.

A printing apparatus is known from EP 3 909 780 A1, comprising: n print heads arranged along a first direction, each print head being in fluid communication with at least two different inks; a printing medium arranged opposite the print head, the printing medium including s printing areas divided along the first direction such that each printing area is configured to be printed by a print head, wherein the printing medium is configured to rotate around a rotational axis; a motion controller that controls the motion of the print heads and the motion of the printing medium; and a printing driver that controls the printing of the print heads, wherein s and n are positive integers greater than 1.

A device for printing rotationally asymmetrical containers is known from US 2016/0221361 A1, comprising: at least one print head; and a rotary table configured to rotationally drive at least one receptacle attached to the rotary table for a rotationally asymmetrical container to be printed about a first rotational axis, the receptacle being arranged eccentric to the first rotational axis of the rotary table and accommodating the container in such a way that an outermost section of a surface to be printed of the container accommodated in the receptacle is guided in a first circular path about the first rotational axis.

A transport unit is known from WO 2015/186592 A1, which places and transports a recording medium on a transport surface curved in a transport direction of the recording medium. A nozzle surface, on which a nozzle opening for discharging ink is provided, is provided opposite the transport surface. A recording head comprises an attachment element to which the recording head is attached, a plurality of attachment elements being provided in different positions in the transport direction.

A device and a method for printing an image on a non-cylindrical, circularly symmetrical surface of an object is known from US 2017/0253024 A1, wherein the printing is carried out using a print head including ink jet printing nozzles with tips in a nozzle plane by rotating the object about the longitudinal axis of the surface, while a printing machine control unit drives the print head in space and controls the operation of the nozzle tips within a predetermined print gap along the surface so as to print the image.

A three-dimensional printer is known from JP 2009184121 A, which carries out a predetermined printing operation by ejecting an ink from a print head onto a surface of an object to be printed. This printer comprises a holding chuck holding the object to be printed; first to third supporting members holding the holding chuck so as to be movable in space; a print head carriage carrying a front end that holds the print head so as to be linearly movable relative to the object to be printed held by the holding chuck; and a right-and-left oscillating driving device. The oscillating driving device rotates and moves the print head in a right-and-left direction, thereby centering an axis of rotation extending up and down, so as to perform the desired printing operation while the ink is being ejected from the print head.

A respective printing machine comprising several print heads that each print a surface of an article in an ink jet printing method is known from US 2013/0215196 A1 and US 2005/0243112 A1, wherein these print heads are arranged in a row longitudinally in relation to an axis of rotation of the article to be printed, wherein a respective direction of the ink ejected by the respective printing nozzles of these print heads and the longitudinal axis of the article to be printed are situated in the same printing plane, and the respective direction of the ink ejected by the respective printing nozzles of these print heads is in each case oriented perpendicularly to the surface of the relevant article to be printed.

A printing machine for printing an object is known from US 2015/0035897 A1, comprising: a chassis; at least four ink jet print heads, which are each suitable for orienting jets of ink toward the object in at least four printing directions; and a system for maintaining and moving the print heads, wherein this system is fastened to the chassis and suitable for moving these print heads between a number of positions relative to the chassis, and wherein the system is designed in such a way that, in each of the positions, the printing directions differ from one another and pass through the same central axis.

SUMMARY

It is an object of some examples herein to provide a printing machine comprising at least one print head, such as to print a print image in good printing quality onto a conically shaped article.

The object is achieved according to some examples herein by the printing machine discussed above. The printing machine includes a mount of the relevant print head that is movably configured so that the relevant print head carries out a rotational movement at least about the vertical axis thereof, the mount changing the position of the relevant print head in space comprising a first positioning drive by way of which the at least one print head can be displaced along the transverse axis thereof; this mount comprising a second positioning drive by way of which the at least one print head can be rotated about the vertical axis thereof; and this mount comprising a third positioning drive by way of which the at least one print head (01) can be rotated about the longitudinal axis thereof The advantages achievable by the examples herein are in particular that the described printing machine can also be used to print an article, in particular a glass article, which, even though it is designed as a body of revolution, does not have an ideal cylindrical shape, but rather is conically designed, and thus has the shape of a cone or a frustum, without distortion and in register. Printing the outer surface of a conical body of revolution without distortion and in register is ensured both by arranging the at least one print head perpendicularly to the surface of the relevant article during the printing process, and a longitudinal cutting plane extending through the relevant print head intersecting an axis of rotation of the relevant article. In geometry, a body of revolution refers to a body having a surface that is formed by rotating a generating curve about an axis of rotation.

The identified solution proves to be especially advantageous for printing, carried out during series production, conical hollow bodies that rotate during the printing process, in particular such hollow bodies that have radial run-out in the order of magnitude of, for example, ±2 mm, which, compared to articles made of a metallic material or of a plastic material or of a fibrous material, such as paper, which are to be printed, is a very large radial run-out, and is almost impossible in practical applications when printing articles made of a metallic material or made of a plastic material or made of a fibrous material, such as paper. However, this is a frequent, if not almost a standard occurrence with hollow bodies designed as glass articles. These glass articles are, for example, bottles, vials or glass packagings, the respective radial run-out of which, induced by the manufacturing process of these glass articles, is in the order of magnitude of, for example, ±2 mm, wherein the radial run-outs in a series of such articles to be printed are additionally also subject to a wide range. Nonetheless, such hollow bodies, however, are to be provided, that is, decorated, on the surface thereof with a print image in good printing quality in an industrial serial production process by a printing machine. Thus far, when printing the surface of a conical hollow body, in particular such a hollow body which has radial run-out in the aforementioned order of magnitude, it was necessary, in order to avoid a potential collision from occurring between the surface of the relevant hollow body and the relevant print head arranged in the printing machine, to space the relevant print head further apart from the surface of the relevant hollow body than is desirable for generating good printing quality. The reason is that commercially available print heads printing in an ink jet printing process are generally designed to be spaced a very small distance of, for example, 1 mm, apart from the surface to be printed. When a hollow body to be printed, due to the geometry thereof, possibly taking into consideration the associated tolerances, makes it necessary to space the relevant print head further apart than is customary from the surface of the relevant hollow body, a larger range arises for the ink droplets ejected by the relevant print head, which generally results in a decreased printing quality with regard to the print image to be created. This reduction in the printing quality is now avoided by the identified solution.

As mentioned, the large tolerances of hollow bodies that are made of glass and to be printed, compared to other print substrates, cause the distance between the relevant print head and the surface of the relevant hollow body to be printed to be dimensioned significantly larger. The ink droplets ejected by the relevant print head therefore must cover a considerably larger travel distance. To accomplish this, the relevant ink droplets must be larger than when printing other print substrates, that is, when hollow bodies made of glass are printed, the respective ink droplets contain a comparatively larger amount of ink. As a result, higher kinetic energy must be supplied to these ink droplets to overcome the air resistance that exists on their travel distance. As a result of the increased need for energy to be processed by the relevant print head, the relevant print head can only be designed with a very limited printing width, wherein this printing width is typically 70 mm for presently commercially available print heads. Another difficulty when creating a print image having a printing length that exceeds this printing width is that these print heads, due to being enclosed in a housing, cannot be arranged in a row in such a way that the respective printing widths thereof would seamlessly complement one another to form a single printing width. Instead, it is necessary to arrange such print heads offset from one another in different printing planes. So as to print the outer surface of a conical body of revolution without distortion and in register, this requires tracking in the respective printing position of the relevant print head.

Register, also referred to as color register, in printer language denotes the exact manner in which individual printing inks during multicolor printing fit together and/or are superimposed. The register thus denotes the accurately aligned printing during several consecutive printing operations. In the case of four-color printing, the four process colors cyan, magenta, yellow and black are usually printed with proper positioning one after the other and at least partially on top of one another. The consecutively printed and partially superimposed printing inks then yield the print image to be printed when viewed together. If these printing inks are not exactly in register with one another, the print image appears to be distorted, that is, blurred, fuzzy or with color misalignments, which in any case results in an inferior quality with respect to the print image to be printed.

The expression "article to be printed" here shall be understood to mean a real three-dimensional object that takes up space and has boundaries as well as a mass. The article to be printed, as mentioned, is preferably designed as a hollow body, in particular as a glass article. The article to be printed has a center of mass and a longitudinal extension or longitudinal axis, with which the axis of rotation corresponds during the printing process.

An article to be printed, in the center of mass or a three-dimensional orthogonal coordinate system anchored in the center of mass of the relevant print head, has three axes that each are perpendicular with respect to one another, namely a longitudinal axis and a transverse axis and a vertical axis in each case. A rotational movement about the respective longitudinal axis is referred to as roll, a rotational movement about the respective transverse axis is referred to as pitch, and a rotational movement about the respective vertical axis is referred to as yaw.

The following is based on an industrial printing process, during which at least one print head printing in an ink jet printing process, preferably several print heads that each print in an ink jet printing process, in a printing machine print a surface of the relevant article. Each of these print heads, enclosed in a housing, comprises at least one row of printing nozzles arranged next to one another, located at a distance in the range of a few millimeters, for example between 1 mm and less than 8 mm, with respect to the surface of the relevant article to be printed, wherein each of these printing nozzles is designed to eject ink, and wherein a length of the relevant row of printing nozzles defines the printing width of the relevant print head. The respective printing width of each of the print heads printing this article in each case in an ink jet printing process is arranged longitudinally with respect to the longitudinal axis of the article to be printed and extends over a section of this article to be printed. Since a longitudinal extension of the article to be printed, and thus a length of the print image to be created, is frequently larger than a printing width of the relevant print head, several print heads are arranged in the described printing machine with the respective printing width thereof in a row longitudinally with respect to the longitudinal axis of the article to be printed. A respective direction of the ink that is ejected from the respective printing nozzles of the possibly several print heads, which are arranged in a row longitudinally with respect to the longitudinal axis of the article to be printed, and the longitudinal axis of the article to be printed are located in the same plane, which is also referred to as a printing plane, wherein the respective direction of the ink ejected from the respective printing nozzles is directed in each case perpendicularly to the surface of the relevant article to be printed so as to generate a high-quality, in particular distortion-free, print image. In particular so as to create a multi-color print image, several different printing planes are provided with respect to the surface of the relevant article to be printed, wherein each of the printing nozzles arranged in the different printing planes ejects inks that differ in color from one another, for example inks in the process colors cyan, magenta, yellow and black. Since each of these printing planes intersects the longitudinal axis of the article to be printed, directly adjacent printing planes create a V formation. In the particularly preferred embodiment of the invention, a series of several articles that each have the same geometry is printed in the printing machine, wherein the geometry thereof has a wide range of the respective tolerances.

BRIEF DESCRIPTION OF THE DRAWINGS

An exemplary embodiment of the invention is illustrated in the drawings and will be described in greater detail below. The drawings show.

DETAILED DESCRIPTION

Figure 1:
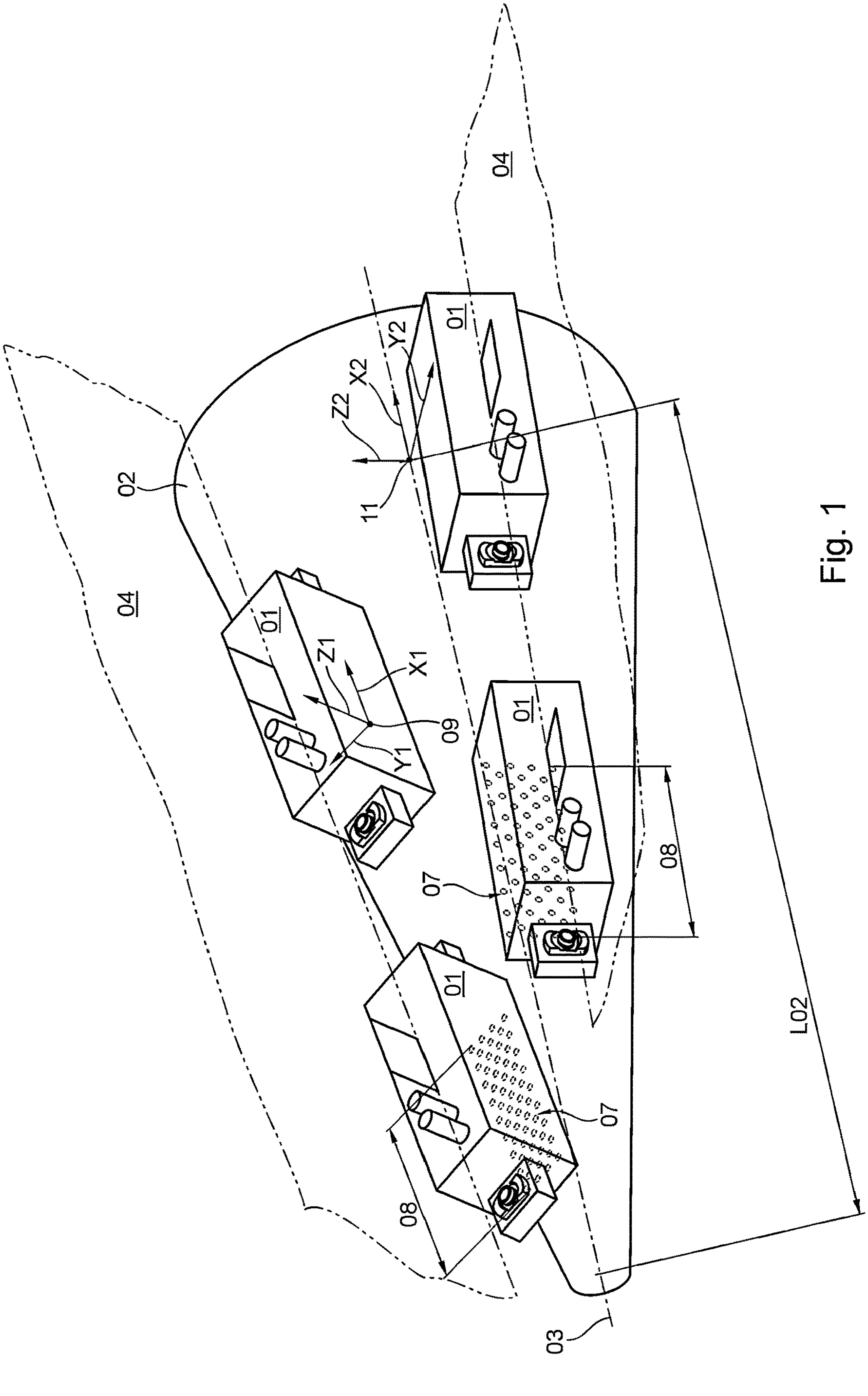
FIG. 1 an arrangement of several print heads that jointly print an article.

FIG. 1, by way of example, schematically shows a perspective illustration in a drastically simplified manner of an array of several, for example four, preferably identical print heads 01 that each print in an ink jet printing process and collectively print at least part of the surface of a conical body of revolution 02. This array of print heads 01 is located in a printing machine which is not described in greater detail here, the composition and operating principle of which are known to those skilled in the art. During the printing process, the body of revolution 02 to be printed rotates about the axis of rotation 03 thereof, wherein a longitudinal axis X2 of the body of revolution 02 to be printed forms this axis of rotation 03. Each of these print heads 01 is arranged, with respect to the surface of the body of revolution 02 to be printed, in such a way that both the print head is arranged, at least during the printing process, perpendicularly to the surface of this body of revolution 02 to be printed and that a longitudinal cutting plane 04 extending through the relevant print head 01 in each case intersects the axis of rotation 03 of the body of revolution 02 to be printed. The respective longitudinal cutting plane 04 of the relevant print head 01 also forms the printing plane 04 thereof.

FIG. 1 shows several, for example two different, printing planes 04, wherein in each case two print heads 01 of the illustrated array, which are arranged in the same printing plane 04, are not seamlessly placed next to one another, but are arranged in a row, spaced apart from one another by a mounting gap 06 in the relevant printing plane 04. Each of the two printing planes 04 intersects the longitudinal axis X2 of the body of revolution 02 to be printed, and the two rows of print heads 01 in this array thus create a V formation.

The print heads 01 arranged in the two printing planes 04 are preferably arranged in rows that are offset from one another. On the side facing the surfaces of the body of revolution 02 to be printed, each of these print heads 01 comprises at least one row, preferably several parallel rows, of printing nozzles 07 arranged next to one another, wherein each of these printing nozzles 07 is designed to eject ink, and wherein a length of the relevant row of printing nozzles 07 defines a printing width 08 of the relevant print head 01. The printing width 08 of the relevant print head 01 is smaller than a length L02 of the body of revolution 02 to be printed, so that in each case only a section on the surface of the body of revolution 02 to be printed can be printed with the printing width 08 of each print head 01. The printing width 08 of the relevant print head 01 is, for example, in a range between 50 mm and 100 mm, preferably 70 mm, while the length L02 of the body of revolution 02 to be printed, and generally also of the print image to be printed onto the outer surface thereof, is, for example, in a range between 200 mm and 300 mm. The respective rows of printing nozzles 07 arranged next to one another, of print heads 01 arranged in the different printing planes 04 in offset rows, are arranged so as to complement one another to form one continuous printing line, wherein this printing line is an outer surface line on the surface of the body of revolution 02 to be printed which is located in the respective longitudinal cutting plane 04 extending through the relevant print heads 01. The at least one print head 01 is, or all print heads 01 of this array are, arranged at a distance between 1 mm and less than 8 mm with respect to the surface of the relevant body of revolution 02 which is to be printed.

It is provided that a three-dimensional, orthogonal coordinate system, the origin of which is arranged in a center of mass 09 of the relevant print head 01 and which is fixed in terms of the print head, has a longitudinal axis X1 and a transverse axis Y1 and a vertical axis Z1, wherein the longitudinal axis X1 of the relevant print head 01 extends parallel to the printing width 08 of this print head 01. A mount 12 holding the relevant print head 01 is preferably designed in such a way that the relevant print head 01 carries out a rotational movement, at least about the vertical axis Z1 thereof. Moreover, this mount 12 of the relevant print head 01 is preferably designed so as to be movable in such a way that the relevant print head 01 not only carries out a rotational movement about the vertical axis Z1 thereof, but also about the transverse axis Y1 thereof and/or about the longitudinal axis X1 thereof. Due to the rotatability of the relevant print head 01 about the vertical axis Z1 thereof, and controlled tracking of the printing position of the relevant print head 01, it is ensured that the at least one print head 01, during the printing process, is always arranged perpendicularly to the surface of the relevant conically shaped article 02 to be printed, even if this article 02 has radial run-out in the order of magnitude of, for example, ±2 mm and/or the tolerances of the geometry thereof have a wide range. Due to the identified solution, the relevant print head 01, as a result of the three-dimensional positionability thereof, can always be positioned in space with respect to the surface of the relevant article 02 in such a way that a longitudinal cutting plane 04 extending through the relevant print head 01 intersects an axis of rotation 03 of the relevant article 02, wherein the axis of rotation 03 of the relevant article 02 is also the longitudinal axis X2 thereof.

According to the present invention, several print heads 01 that each print the surface of the relevant article 02 in an ink jet printing process are provided, wherein these print heads 01 are arranged in a row longitudinally in relation to the axis of rotation X2 of the article 02 to be printed, wherein a respective direction of the ink ejected by the respective printing nozzles 07 of these print heads 01 and the longitudinal axis X2 of the article 02 to be printed are situated in the same printing plane 04, and the respective direction of the ink ejected by the respective printing nozzles 07 of these print heads 01 is in each case oriented perpendicularly to the surface of the relevant article 02 to be printed. Several different printing planes 04 are provided with respect to the surface of the relevant article 02 to be printed, wherein each of the printing nozzles 07 arranged in the different printing planes 04 ejects the same ink or inks that differ in color from one another, directly adjacent printing planes 04 creating a V formation.

In addition to the rotationally movable mount 12 for the relevant print head 01, it is furthermore preferably provided that the article 02 to be printed is held by a holding device that belongs to the printing machine and differs from the mount 12 that holds the relevant print head 01. This holding device is designed, for example, as a clamping device, which holds the article 02 to be printed by a force acting in opposite directions at the two end faces. As an alternative, this holding device can, for example, be designed as a mandrel holding the article 02 to be printed by vacuum pressure or as a clamping mandrel. In addition, a three-dimensional, orthogonal coordinate system, the origin of which is arranged in a center of mass 11 of the relevant article 02 and which is fixed in terms of the article, has the longitudinal axis X2 of the relevant article 02 and a transverse axis Y2 and a vertical axis Z2, wherein the longitudinal axis X2 of the relevant article 02 in general extends parallel to the axis of rotation 03 of this article 02. It is advantageously provided that the holding device of the relevant article 02 is movably designed in such a way that the relevant article 02 carries out a respective rotational movement about the transverse axis Y2 thereof and/or about the vertical axis Z2 thereof.

Figure 2:
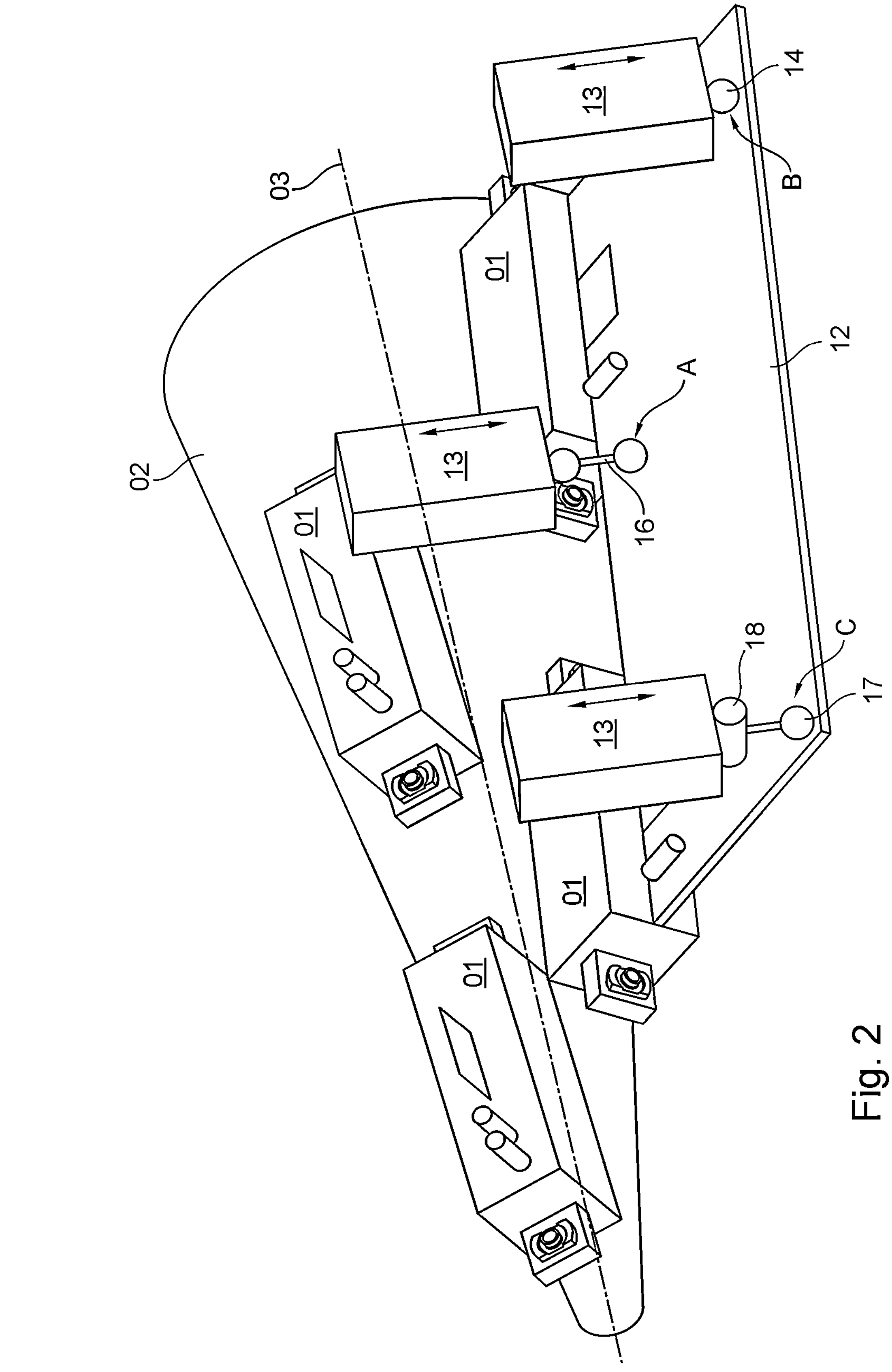
FIG. 2 a first exemplary embodiment of a mount changing a position of the print heads in space.

FIG. 2, in a perspective illustration, schematically in a drastically simplified manner shows a first exemplary embodiment for the mount holding the relevant print head 01, the mount, for example, being designed such that the relevant print head 01 carries out at least a rotational movement about the vertical axis Z1 thereof. In this first exemplary embodiment, a panel 12 that is rigidly connected to the relevant print head 01 is arranged in the printing plane 04 of the relevant print head 01, wherein, if several print heads 01 are arranged in the same printing plane 04, these print heads 01, which are preferably arranged in a row, are rigidly connected to the same rigid panel 12. If print heads 01 that are arranged in several different printing planes 04 are provided, a respective rigid panel 12 is arranged in each of these printing planes 04, wherein the relevant print heads 01 of a certain printing plane 04 are rigidly connected to the rigid panel 12 arranged in this printing plane 04. Three, for example identical, preferably electrically actuated or at least actuatable positioning drives 13 are provided, which at three different contact points A; B; C, engage on the respective rigid panel 12, for example in each case via a ball joint 14 or a coupler 16, and during the respective actuation thereof change the position of the relevant rigid panel 12 and thus the position of the relevant at least one print head 01 in space. The relevant coupler 16 comprises, for example, a ball 17 or a cylinder 18 at the respective connecting point thereof with the relevant rigid panel 12 and/or with the relevant positioning drive 13. Each of the positioning drives 13 is designed as a linear motor, for example, wherein each of these positioning drives 13 is designed to implement an, in particular bidirectional, adjustment path. The three positioning drives 13 of this first embodiment are controlled by a control unit that, for example, controls the printing process. This control unit is designed so as to track, or at least be able to track, the respective printing position of the relevant print head 01 during an ongoing printing process, in keeping with the geometrical requirements of the article 02 to be printed, that is, based on the surface geometry thereof.

Figure 3:
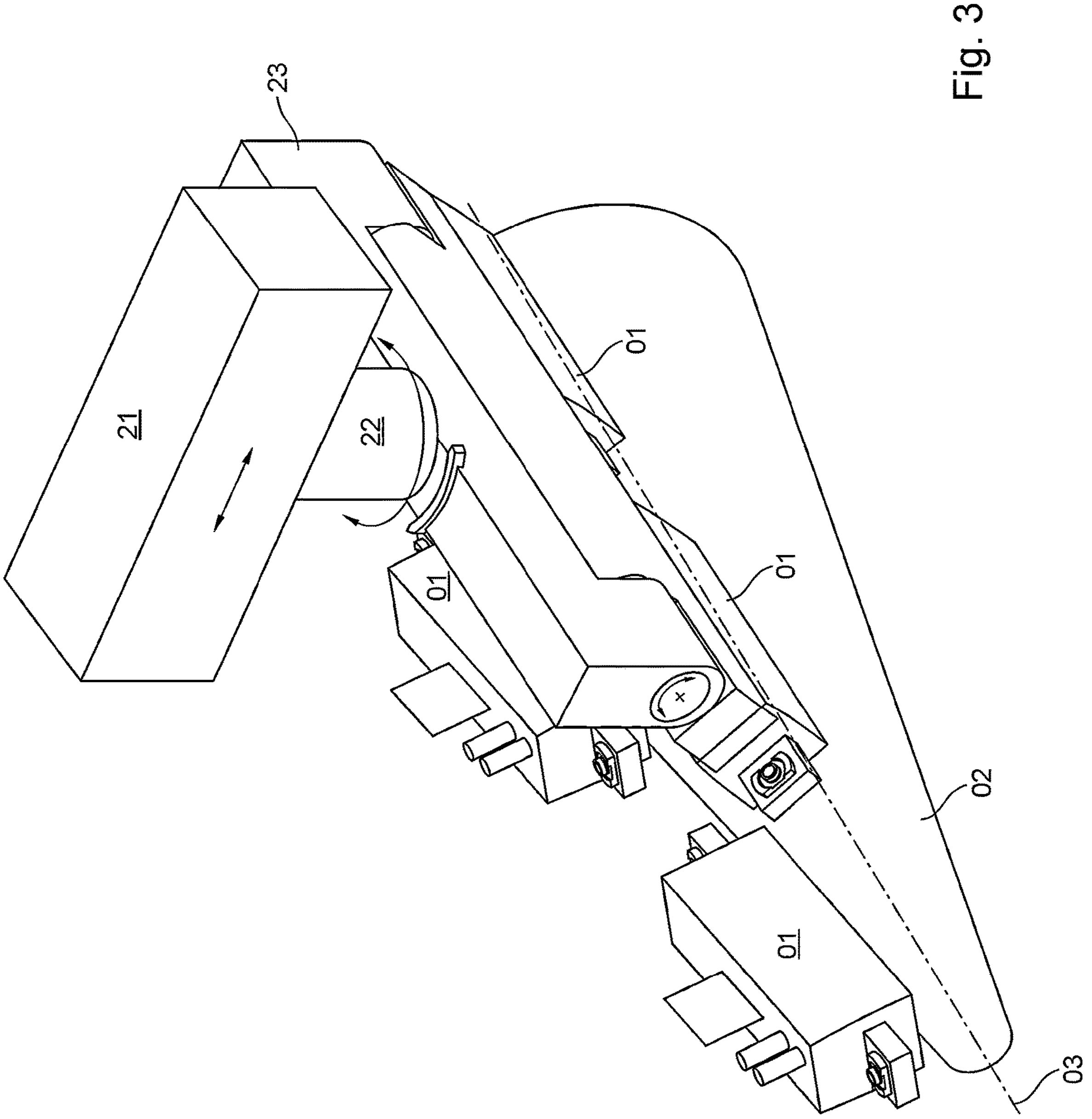
FIG. 3 a second exemplary embodiment of the mount changing the position of the print heads in space.

FIG. 3, in a perspective illustration, schematically in a drastically simplified manner shows a second exemplary embodiment for the mount holding the relevant print head 01, the mount, for example, being designed such that the relevant print head 01 carries out at least a rotational movement about the vertical axis Z1 thereof. In this second exemplary embodiment, this mount comprises a first positioning drive 21, by way of which the at least one print head 01 can be displaced, preferably bidirectionally, along the transverse axis Y1 thereof. This mount also comprises a second positioning drive 22, by way of which the at least one print head 01 can be, preferably bidirectionally, rotated about the vertical axis Z1 thereof. In addition, this mount comprises a third positioning drive 23, by way of which the at least one print head 01 can be rotated, preferably bidirectionally, about the longitudinal axis X1 thereof. If several print heads 01 arranged in the same printing plane 04 are present, these print heads 01, which are preferably arranged in a row, can each be collectively displaced by the relevant positioning drives 21; 22; 23 along the respective transverse axis Y1 and/or rotated about the respective longitudinal axis X1 and/or the respective vertical axis Z1. These positioning drives 21; 22; 23 changing the position of the relevant print head 01 in space are preferably electrically actuated, or at least actuatable, and controlled by a control unit controlling, for example, the printing process. The control unit in this second exemplary embodiment is also designed so as to track, or at least be able to track, the respective printing position of the relevant print head 01 during an ongoing printing process, in keeping with the geometrical requirements of the article 02 to be printed, that is, based on the surface geometry thereof.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A printing machine comprising at least one print head (01), a relevant print head (01) of the at least one print head (01) being configured to print, in an ink jet printing process, a surface of an article (02) that rotates during the ink jet printing process; a printing width (08) of the relevant print head (01) in each case extending over a relevant section of a length (L02) of the article (02) to be printed; the relevant section in each case extending longitudinally in relation to a longitudinal axis (X2) of the article (02) to be printed; a three-dimensional, orthogonal coordinate system, the origin of which is arranged in a center of mass (09) of the relevant print head (01) and which is fixed in terms of the print head, having a longitudinal axis (X1) and a transverse axis (Y1) and a vertical axis (Z1); the longitudinal axis (X1) of the relevant print head (01) extending parallel to the printing width (08) of this print head (01); a plurality of print heads (01) that each print the surface of the relevant article (02) in an ink jet printing process being provided; these print heads (01) being arranged in a row longitudinally in relation to the longitudinal axis (X2) of the article (02) to be printed; a respective direction of the ink ejected by the respective printing nozzles (07) of these print heads (01) and the longitudinal axis (X2) of the article (02) to be printed being situated in the same printing plane (04); the respective direction of the ink ejected by the respective printing nozzles (07) of these print heads (01) being in each case oriented perpendicularly to the surface of the relevant article (02) to be printed; a plurality of different printing planes (04) being provided with respect to the surface of the relevant article (02) to be printed; and directly adjacent printing planes (04) creating a V formation; a control unit being provided; this control unit being designed so as to track, or at least be able to track, a respective printing position of the relevant print head (01) during an ongoing printing process based on a surface geometry of the article (02) to be printed; and a mount holding the relevant print head (01) being provided, characterized in that the mount of the relevant print head (01) is movably designed in such a way that the relevant print head (01) carries out a rotational movement at least about the vertical axis (Z1) thereof, the mount changing the position of the relevant print head (01) in space comprising a first positioning drive (21) by way of which the at least one print head (01) can be displaced along the transverse axis (Y1) thereof; this mount comprising a second positioning drive (22) by way of which the at least one print head (01) can be rotated about the vertical axis (Z1) thereof; and this mount comprising a third positioning drive (23) by way of which the at least one print head (01) can be rotated about the longitudinal axis (X1) thereof.

2. The printing machine according to claim 1, characterized in that the mount of the relevant print head (01) is designed so as to be movable in such a way that the relevant print head (01) not only carries out a rotational movement about the vertical axis (Z1) thereof, but also about the transverse axis (Y1) thereof and/or about the longitudinal axis (X1) thereof.

3. The printing machine according to claim 1, characterized in that each of the print heads (01), during the printing process, is arranged perpendicularly to the surface of the relevant article (02) to be printed, a longitudinal cutting plane (04) extending through the relevant print head (01) intersecting an axis of rotation (03) of the relevant article (02), and the axis of rotation (03) of the relevant article (02) being the longitudinal axis (X2) thereof.

4. The printing machine according to claim 1, characterized in that each of the print heads (01) is in each case arranged at a distance between 1 mm and less than 8 mm with respect to the surface of the relevant article (02) to be printed.

5. The printing machine according to claim 1, characterized in that each of the print heads (01) comprises at least one row of printing nozzles (07) arranged next to one another, a length of the relevant row of printing nozzles (07) defining the printing width (08) of the relevant print head (01).

6. The printing machine according to claim 1, characterized in that the article (02) to be printed is held in a holding device that belongs to the printing machine, a three-dimensional, orthogonal coordinate system, the origin of which is arranged in a center of mass (11) of the relevant article (02) and which is fixed in terms of the article, comprising the longitudinal axis (X2) of the relevant article (02) and a transverse axis (Y2) and a vertical axis (Z2); and the holding device of the relevant article (02) being movably designed in such a way that the relevant article (02) in each case carries out a rotational movement about the transverse axis (Y2) thereof and/or about the vertical axis (Z2) thereof.

7. The printing machine according to claim 1, characterized in that print heads (01) arranged in the same printing plane (04) can each be collectively displaced by the relevant positioning drives (21; 22; 23) along their respective transverse axis (Y1) and/or rotated about their respective longitudinal axis (X1) and/or their respective vertical axis (Z1).

8. The printing machine according to claim 1, characterized in that the positioning drives (21; 22; 23) changing the position of the relevant print head (01) in space are electrically actuated or at least actuatable.

9. The printing machine according to claim 1, characterized in that the positioning drives (21; 22; 23) changing the position of the relevant print head (01) in space are controlled by the control unit.

* * * * *